US012717736B2

United States Patent

(12) United States Patent
Gao et al.

(10) Patent No.: US 12,717,736 B2
(45) Date of Patent: Aug. 25, 2026

(54) DATA PROCESSING DEVICE, COPROCESSOR AND METHODS PERFORMED THEREBY FOR INTERRUPT HANDLING

(71) Applicant: Telefonaktiebolaget LM Ericsson (publ), Stockholm (SE)

(72) Inventors: Tonghai Gao, Beijing (CN); Pengfei Ma, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/858,174

(22) PCT Filed: May 17, 2022

(86) PCT No.: PCT/CN2022/093370

§ 371 (c)(1),
(2) Date: Oct. 18, 2024

(87) PCT Pub. No.: WO2023/220928

PCT Pub. Date: Nov. 23, 2023

(65) Prior Publication Data

US 2025/0335379 A1 Oct. 30, 2025

(51) Int. Cl.
*G06F 13/24* (2006.01)
*G06F 9/48* (2006.01)

(52) U.S. Cl.
CPC ............ *G06F 13/24* (2013.01); *G06F 9/4812* (2013.01)

(58) Field of Classification Search
None
See application file for complete search history.

(56) References Cited

U.S. PATENT DOCUMENTS 5,727,227 A * 3/1998 Schmidt .................. G06F 9/462 712/E9.067
7,257,658 B2 * 8/2007 Winkler .................. G06F 13/24 710/266

(Continued)

FOREIGN PATENT DOCUMENTS

CN 112130982 A 12/2020
CN 114020439 A 2/2022
EP 2609595 B1 * 4/2016 ............ G11C 15/04

OTHER PUBLICATIONS

Machine Translation of Japanese Patent Application JP 2017091544 A, published May 25, 2017. (Year: 2017).*

(Continued)

*Primary Examiner* — Steven G Snyder
(74) *Attorney, Agent, or Firm* — Sage Patent Group

(57) ABSTRACT

A data processing device includes a central processing unit (CPU), and a coprocessor to perform predetermined tasks for a plurality of sessions, and to report, for at least one session satisfying a predetermined condition, at least one interrupt event to the CPU. The coprocessor maintains a bitmap table and row validity data. The bitmap table indicates, for each of the plurality of sessions, whether there is an interrupt event needing to be reported to the CPU. The row validity data indicates, for each of rows of the bitmap table, whether the row has at least one interrupt event needing to be reported to the CPU. The CPU is configured to, in response to an interrupt signal triggered by the (Continued)

coprocessor, read, from the bitmap table, at least one row that has at least one interrupt event needing to be reported to the CPU, according to the row validity data.

18 Claims, 5 Drawing Sheets

(56) References Cited

U.S. PATENT DOCUMENTS

| | | | | |
|---|---|---|---|---|
| 7,328,294 | B2 * | 2/2008 | Kim | G06F 9/5011 710/264 |
| 10,664,425 | B2 * | 5/2020 | Malalangaradhos | G06F 13/26 |
| 11,258,700 | B1 * | 2/2022 | Bajaj | H04L 41/0856 |
| 11,374,849 | B1 * | 6/2022 | Bajaj | H04L 43/10 |
| 12,379,956 | B2 * | 8/2025 | Neiger | G06F 9/4812 |
| 2003/0105798 | A1 * | 6/2003 | Kim | G06F 9/4812 718/105 |
| 2004/0186967 | A1 * | 9/2004 | Anand | H04L 47/15 711/156 |
| 2008/0147905 | A1 | 6/2008 | Shi et al. | |
| 2019/0163251 | A1 | 5/2019 | Gada et al. | |
| 2019/0227801 | A1 | 7/2019 | Sankaran et al. | |
| 2019/0278646 | A1 | 9/2019 | Fernandez et al. | |
| 2022/0200885 | A1 * | 6/2022 | Bajaj | H04L 43/0805 |
| 2023/0142399 | A1 * | 5/2023 | Neiger | G06F 13/24 710/260 |

OTHER PUBLICATIONS

International Search Report and Written Opinion of the International Searching Authority, PCT/CN2022/093370, mailed Dec. 26, 2022, 8 pages.

Knight, S. et al., “Virtual Router Redundancy Protocol,” Network Working Group, Request for Comments: 2338 (RFC 2338), Apr. 1998, 27 pages.

Hinden, R. (Ed.), “Virtual Router Redundancy Protocol (VRRP),” Network Working Group, Request for Comments: 3768 (RFC 3768), Apr. 2004, 27 pages.

Nadas, S. (Ed.), “Virtual Router Redundancy Protocol (VRRP) Version 3 for IPV4 and IPV6,” Internet Engineering Task Force (IETF), Request for Comments: 5798 (RFC 5798), Mar. 2010, 40 pages.

* cited by examiner

DATA PROCESSING DEVICE, COPROCESSOR AND METHODS PERFORMED THEREBY FOR INTERRUPT HANDLING

CROSS REFERENCE TO RELATED APPLICATIONS

This application is a 35 U.S.C. § 371 national stage application of PCT International Application No. PCT/CN2022/093370 filed on May 17, 2022, the disclosure and content of which is incorporated by reference herein in its entirety.

TECHNICAL FIELD

Embodiments of the disclosure generally relate to data processing, and, more particularly, to a data processing device, a coprocessor and methods performed thereby.

BACKGROUND

This section introduces aspects that may facilitate better understanding of the present disclosure. Accordingly, the statements of this section are to be read in this light and are not to be understood as admissions about what is in the prior art or what is not in the prior art.

Virtual router redundancy protocol (VRRP) is used to solve the problem of gateway single point of failure. With the VRRP, multiple gateway devices of a user's network join a backup group to form redundant backup. This can ensure that when one or more gateways fail, other gateways will replace the failed gateway devices, thus ensuring the continuity and reliability of external communication of the user's network.

VRRP connects multiple devices in a local area network that can serve as gateways. These devices are divided together to form a VRRP backup group, which is equivalent to a virtual router. The device in the VRRP backup group that undertakes the task of packet forwarding is the master device. When the master device fails, the equipment which is capable of replacing the master device in the VRRP backup group is the backup device.

Devices in a VRRP backup group may determine their roles by priority. FIG. 1A illustrates role election in VRRP. As shown, the devices 11 and 12 are connected via the IP network 13. At step 1, by exchanging VRRP messages, the devices 11 and 12 may know priorities of each other. Since the priority of the device 11 is higher than the priority of the device 12, the device 11 takes the role of master device and the device 12 takes the role of backup device. Then, at step 2, the master device 11 sends free address resolution protocol (ARP) messages to back-up the virtual group of VRRP. At step 3, the master device 11 periodically sends VRRP messages to tell its configuration information (priority, etc.) and working condition.

FIG. 1B illustrates no-preemption mode in VRRP. Suppose that: the device 12 joins a VRRP backup group in which the device 11 is the master device; and by receiving a VRRP message from the device 11, the device 12 knows that the priority of the device 11 is lower than the priority of itself. Since no-preemption mode is configured, the device 12 remains to be a backup device. Then, at step 1, the device 11 fails. In such situation, the device 12 switches to be a master device at step 2. At step 3, the device 12 periodically sends VRRP messages to the device 11.

FIG. 1C illustrates preemption mode in VRRP. Also suppose that: the device 12 joins a VRRP backup group in which the device 11 is the master device; and by receiving a VRRP message from the device 11, the device 12 knows that the priority of the device 11 is lower than the priority of itself. Since preemption mode is configured, the device 12 switches to be a master device at step 1. Then at step 2, the device 12 periodically sends VRRP messages to the device 11.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for a data processing device, a coprocessor and methods performed thereby. In particular, one of the problems to be solved by the disclosure is that how to reduce interrupt reporting times for numerous interrupt sources, e.g. by almost simultaneously reporting interrupts caused by numerous interrupt sources in an efficient way, has not been discussed.

According to a first aspect of the disclosure, there is provided a data processing device. The data processing device may comprise a central processing unit (CPU), and a coprocessor configured to perform predetermined tasks for a plurality of sessions, and to report, for at least one session satisfying a predetermined condition, at least one interrupt event to the CPU. The coprocessor may be configured to maintain: a bitmap table indicating, for each of the plurality of sessions, whether there is an interrupt event needing to be reported to the CPU; and row validity data indicating, for each of rows of the bitmap table, whether the row has at least one interrupt event needing to be reported to the CPU. The CPU may be configured to, in response to an interrupt signal triggered by the coprocessor, read, from the bitmap table, at least one row that has at least one interrupt event needing to be reported to the CPU, according to the row validity data.

In this way, the frequency of interactions between the CPU and the coprocessor can be reduced thereby improving the performance of the CPU.

In an embodiment of the disclosure, the coprocessor may comprise a memory configured to store the bitmap table.

In an embodiment of the disclosure, the coprocessor may comprise a register configured to store the row validity data.

In an embodiment of the disclosure, the row validity data for a row of the bitmap table may be a result of an OR operation between bits of the row.

In an embodiment of the disclosure, the coprocessor may be configured to operate in a first mode where the interrupt signal is triggered immediately after there is an interrupt event needing to be reported to the CPU.

In an embodiment of the disclosure, the coprocessor may be configured to operate in a second mode where the interrupt signal is triggered when a predetermined time period has elapsed since there is an interrupt event needing to be reported to the CPU.

In an embodiment of the disclosure, the coprocessor may comprise a timer whose expiry time is equal to the predetermined time period.

In an embodiment of the disclosure, the interrupt event may comprise a first type of interrupt event and a second type of interrupt event. The coprocessor may be configured to maintain, for each of the first type of interrupt event and the second type of interrupt event, a separate set of the bitmap table and the row validity data.

In an embodiment of the disclosure, when an interrupt event occurs, there may be an interrupt event needing to be reported to the CPU. Alternatively, when an interrupt event occurs for a session and there has not been a same interrupt event reported previously to the CPU for the session, there may be an interrupt event needing to be reported to the CPU. Alternatively, when an interrupt event occurs for a session, and there has been a same interrupt event reported previously to the CPU for the session, and the CPU has finished handling of the session, there may be an interrupt event needing to be reported to the CPU.

In an embodiment of the disclosure, the coprocessor may be configured to maintain a mask table indicating, for each of the plurality of sessions, whether the session is in a masked state where an interrupt event is prevented from being reported to the CPU when the interrupt event occurs.

In an embodiment of the disclosure, the coprocessor may comprise a memory configured to store the mask table.

In an embodiment of the disclosure, the coprocessor may be configured to set a session in the mask table to be in the masked state, when a same interrupt event has been reported previously to the CPU for the session and the CPU has not finished handling of the session.

In an embodiment of the disclosure, the coprocessor may be configured to, when an interrupt event occurs for a session and the session is not indicated by the mask table to be in the masked state, set the bitmap table to indicate, for the session, that there is an interrupt event needing to be reported to the CPU.

In an embodiment of the disclosure, the predetermined task may be associated with one of: virtual router redundancy protocol (VRRP); bidirectional forwarding detection (BFD); operation, administration and maintenance (OAM); connectivity fault management (CFM); and memory error checking and correcting (ECC).

In an embodiment of the disclosure, the coprocessor may be implemented by one of: a field programmable gate array (FPGA); a specific application integrated circuit (ASIC); a data processing unit (DPU); and an intelligence processing unit (IPU).

In an embodiment of the disclosure, the data processing device may be one of a communication device, and a network device.

According to a second aspect of the disclosure, there is provided a method performed by a data processing device. The data processing device may comprise a CPU, and a coprocessor configured to perform predetermined tasks for a plurality of sessions, and to report, for at least one session satisfying a predetermined condition, at least one interrupt event to the CPU. The method may comprise maintaining, by the coprocessor, a bitmap table indicating, for each of the plurality of sessions, whether there is an interrupt event needing to be reported to the CPU. The method may further comprise maintaining, by the coprocessor, row validity data indicating, for each of rows of the bitmap table, whether the row has at least one interrupt event needing to be reported to the CPU. The method may further comprise, in response to an interrupt signal triggered by the coprocessor, reading, by the CPU, from the bitmap table, at least one row that has at least one interrupt event needing to be reported to the CPU, according to the row validity data.

In this way, the frequency of interactions between the CPU and the coprocessor can be reduced thereby improving the performance of the CPU.

In an embodiment of the disclosure, the coprocessor may comprise a memory configured to store the bitmap table.

In an embodiment of the disclosure, the coprocessor may comprise a register configured to store the row validity data.

In an embodiment of the disclosure, the row validity data for a row of the bitmap table may be a result of an OR operation between bits of the row.

In an embodiment of the disclosure, in a first mode of the coprocessor, the interrupt signal may be triggered immediately after there is an interrupt event needing to be reported to the CPU.

In an embodiment of the disclosure, in a second mode of the coprocessor, the interrupt signal may be triggered when a predetermined time period has elapsed since there is an interrupt event needing to be reported to the CPU.

In an embodiment of the disclosure, the coprocessor may comprise a timer whose expiry time is equal to the predetermined time period.

In an embodiment of the disclosure, the interrupt event may comprise a first type of interrupt event and a second type of interrupt event. A separate set of the bitmap table and the row validity data may be maintained for each of the first type of interrupt event and the second type of interrupt event.

In an embodiment of the disclosure, when an interrupt event occurs, there may be an interrupt event needing to be reported to the CPU. Alternatively, when an interrupt event occurs for a session and there has not been a same interrupt event reported previously to the CPU for the session, there may be an interrupt event needing to be reported to the CPU. Alternatively, when an interrupt event occurs for a session, and there has been a same interrupt event reported previously to the CPU for the session, and the CPU has finished handling of the session, there may be an interrupt event needing to be reported to the CPU.

In an embodiment of the disclosure, the method may further comprise maintaining, by the coprocessor, a mask table indicating, for each of the plurality of sessions, whether the session is in a masked state where an interrupt event is prevented from being reported to the CPU when the interrupt event occurs.

In an embodiment of the disclosure, the coprocessor may comprise a memory configured to store the mask table.

In an embodiment of the disclosure, a session in the mask table may be set by the coprocessor to be in the masked state, when a same interrupt event has been reported previously to the CPU for the session and the CPU has not finished handling of the session.

In an embodiment of the disclosure, when an interrupt event occurs for a session and the session is not indicated by the mask table to be in the masked state, the bitmap table may be set by the coprocessor to indicate, for the session, that there is an interrupt event needing to be reported to the CPU.

In an embodiment of the disclosure, the predetermined task may be associated with one of: VRRP; BFD; OAM; CFM; and memory ECC.

In an embodiment of the disclosure, the coprocessor may be implemented by one of: an FPGA; an ASIC; a DPU; and an IPU.

In an embodiment of the disclosure, the data processing device may be one of a communication device, and a network device.

According to a third aspect of the disclosure, there is provided a coprocessor for use in data processing device. The data processing device may comprise a CPU, and the coprocessor configured to perform predetermined tasks for a plurality of sessions, and to report, for at least one session satisfying a predetermined condition, at least one interrupt event to the CPU. The coprocessor may be configured to maintain: a bitmap table indicating, for each of the plurality of sessions, whether there is an interrupt event needing to be reported to the CPU; and row validity data indicating, for each of rows of the bitmap table, whether the row has at least one interrupt event needing to be reported to the CPU.

In this way, it is possible to reduce the frequency of interactions between the CPU and the coprocessor thereby improving the performance of the CPU.

According to a fourth aspect of the disclosure, there is provided a method performed by a coprocessor for use in data processing device. The data processing device may comprise a CPU, and the coprocessor configured to perform predetermined tasks for a plurality of sessions, and to report, for at least one session satisfying a predetermined condition, at least one interrupt event to the CPU. The method may comprise maintaining a bitmap table indicating, for each of the plurality of sessions, whether there is an interrupt event needing to be reported to the CPU. The method may further comprise maintaining row validity data indicating, for each of rows of the bitmap table, whether the row has at least one interrupt event needing to be reported to the CPU.

In this way, it is possible to reduce the frequency of interactions between the CPU and the coprocessor thereby improving the performance of the CPU.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

Figure 1A:
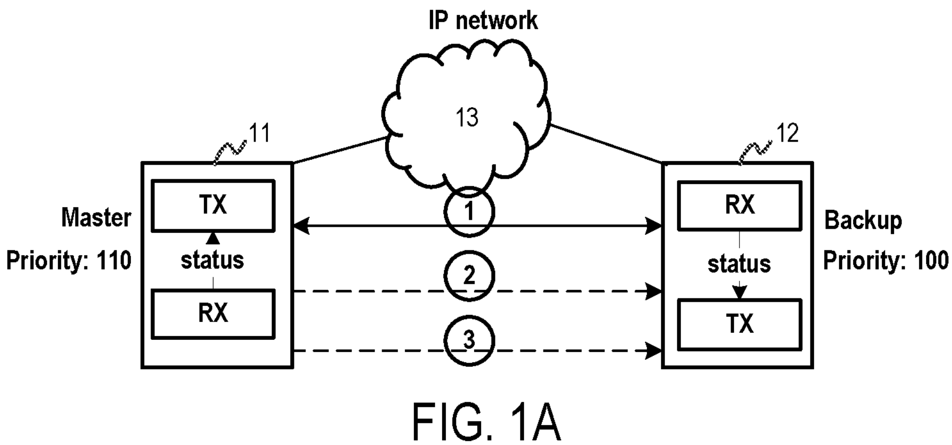
FIG. 1A is a diagram illustrating role election in VRRP.
Figure 1B:
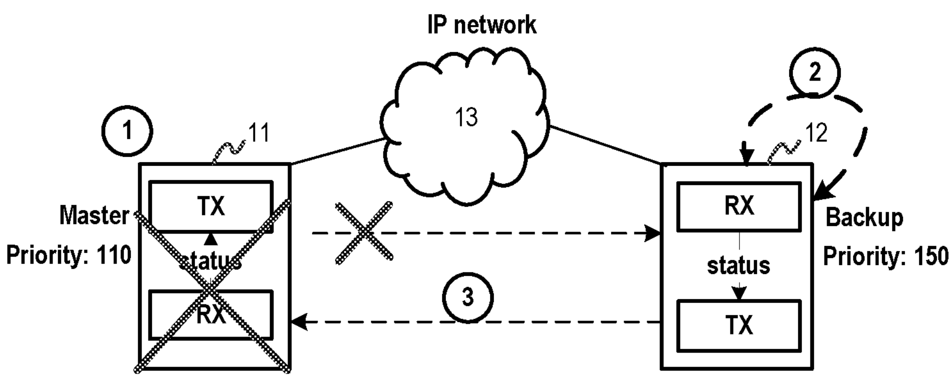
FIG. 1B is a diagram illustrating no-preemption mode in VRRP.
Figure 1C:
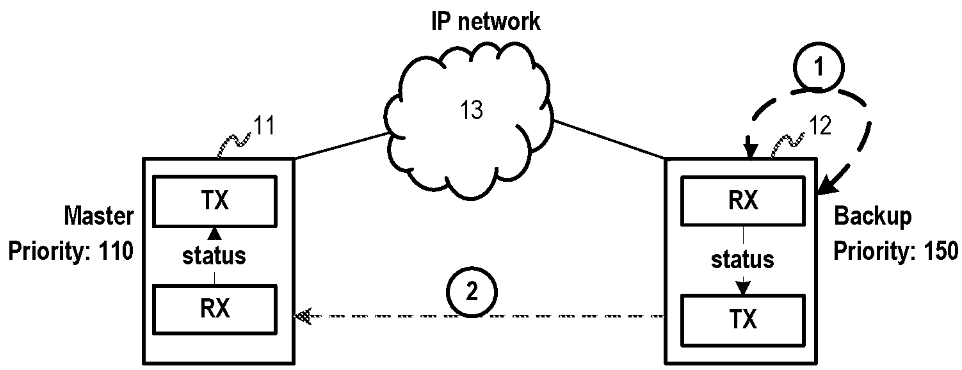
FIG. 1C is a diagram illustrating preemption mode in VRRP.

For the purpose of explanation, details are set forth in the following description in order to provide a thorough understanding of the embodiments disclosed. It is apparent, however, to those skilled in the art that the embodiments may be implemented without these specific details or with an equivalent arrangement.

Generally, VRRP may have two key performance indicators (KPIs). The first KPI is scale, which may be up to kilo sessions (e.g. 1024 sessions) with 3 ms sending packet interval. The second KPI is performance, which may be, for example, 50 ms traffic convergence time.

It is usual to realize full VRRP function by CPU. Several threads may be created for realizing VRRP packet receiving, sending, monitoring and status transition. Before, when the specifications were not big and the transmission time interval was not small, the pure CPU scheme was appropriate. However, currently, with the evolution of the network, the specifications are getting bigger and bigger, and the sending interval is getting smaller and smaller. The pure CPU scheme is hard to meet the requirements.

Using field programmable gate array (FPGA) to accelerate is a common method, such as sending and receiving packets by FPGA. However, how to cooperate efficiently between CPU and FPGA is a great challenge.

Take timeout detection as an example. There is an existing solution relating to an in-device message forwarding fault detection method and device, and is applicable to switch device. The switch device comprises a CPU, a switching chip and an FPGA. In the method, the CPU receives an interrupt event reported by the FPGA. The CPU obtains several latest time stamps of the record from the FPGA. The CPU extracts the first timestamp corresponding to the message with the session state as down state from the latest several time stamps, and extracts the second timestamp later than the first timestamp. If the CPU confirms the time interval between the second time stamp and the first time stamp is not less than the set session detection interval, then the CPU confirms that there is no fault in the message forwarding in the switch device. If the CPU confirms the time interval between the second time stamp and the first time stamp is less than the set session detection interval, then the CPU confirms that there is a fault in the message forwarding in the switch device. Thereby, it can quickly locate the condition of whether there is message forwarding fault in the switch device, providing an effective basis for the correctness of the detection result.

In the above existing solution, the FPGA records time stamps and the CPU performs calculation on the time stamps. However, a lot of calculations are still done by the CPU, and frequent interruption to the CPU will affect the performance of the CPU.

In an embodiment of the present disclosure, the functions of the FPGA and the CPU are divided in the following way. The CPU maintains VRRP state machine and protocol stack. The FPGA is in charge of packet sending and receiving. The CPU configures the FPGA by peripheral component interconnect express (PCI-E). The configuration may include VRRP packet template for sending, VRRP parameter (like priority, checksum etc.) for receiving check, and other control parameters about interval and VRRP status for controlling FPGA sending enable and disable.

The FPGA in the master device periodically sends VRRP advertisement packet to inform the backup device of its own status. The FPGA in the master device sends Priority 0 packet to inform the backup device that the mater device fails. The FPGAs in the backup devices receive packets from the master device and compare priority, report specific packet to the CPU, otherwise terminate. The FPGA in the backup devices receive packets from the master device, and when none packets are received in 3 cycles, it will be overtime. Implementing timeout check in the FPGA can also greatly save the CPU workload.

The FPGA reports VRRP timeout to the CPU by interrupt. The CPU creates a thread for reading interrupt file description. Once receiving an interruption, the CPU will trigger state machine for VRRP transition to master state. If the FPGA in the master device receives a packet with higher priority than itself, it will report this specific VRRP packet to the CPU by PCI-E direct memory access (DMA) and raise DMA interruption. The CPU creates a thread for reading PCI-E DMA. Once receiving a packet, after validation checking and phrasing, the CPU will trigger state machine for VRRP transition to backup state.

Figure 2:
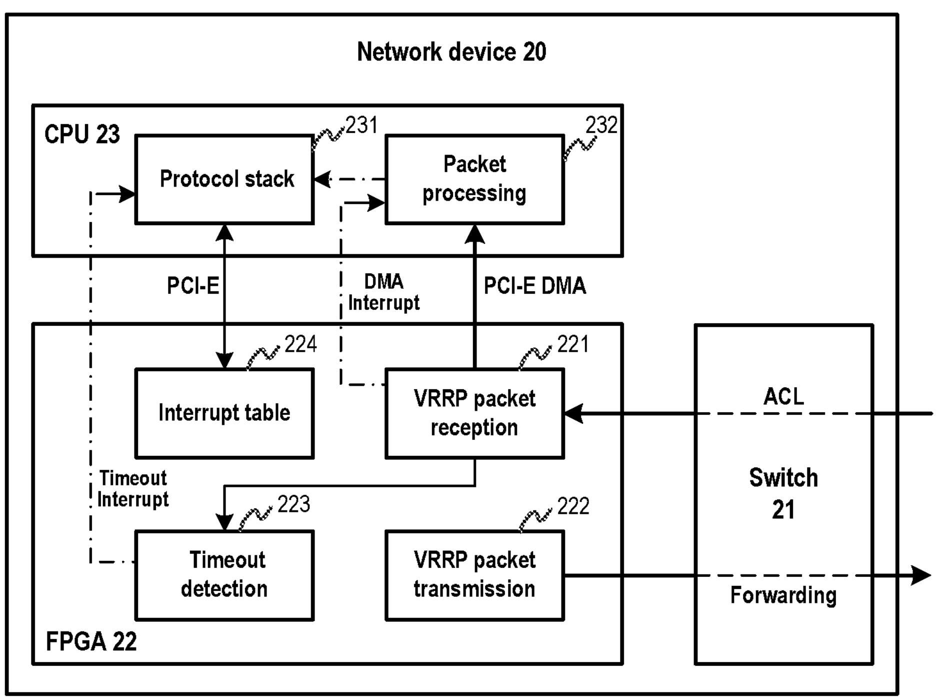
FIG. 2 is a diagram illustrating a network device according to an embodiment.

FIG. 2 is a diagram illustrating a network device according to the embodiment. As shown, the network device 20 comprises a switch 21, an FPGA 22 and a CPU 23. The switch 21 is responsible for packet reception (e.g. by using access control list (ACL)) and packet forwarding. The FPGA 22 contains a VRRP packet reception module 221, a VRRP packet transmission module 222, a timeout detection module 223 and an interrupt table 224. The CPU 23 contains a protocol stack 231 and a packet processing module 232. The VRRP packet reception module 221 is responsible for receiving VRRP packets. The VRRP packet transmission module 222 is responsible for transmitting VRRP packets. The timeout detection module 223 is responsible for detecting timeout event(s) based on the VRRP packets received by the VRRP packet reception module 221. When detecting a timeout event, information about the timeout event may be input to the interrupt table 224 and a timeout interrupt may be initiated to the CPU 23 so that the information about the timeout event can be read by the CPU 23 from the interrupt table 224. In addition, in a case where the network device 20 is a master device, when the VRRP packet reception module 221 receives a specific VRRP packet with higher priority than itself, the specific VRRP packet may be put into CPU double data rate (DDR) through DMA, information about a DMA interrupt event may be input to the interrupt table 224 and a DMA interrupt may be initiated to the CPU 23, so that the information about the DMA interrupt event can be read by the CPU 23 from the interrupt table 224 and thus the specific VRRP packet can be read by the packet processing module 232 of the CPU 23 by PCI-E DMA.

In the network device 20 of FIG. 2, there are two key channels between the CPU 23 and the FPGA 22 to realize VRRP basic functions. Once a timeout interrupt is detected, the FPGA 22 raises a timeout interrupt, and the CPU 23 fetches the session identifier (ID) from the FPGA 22. Then the CPU 23 is just in charge of handling protocol stack 231 and transmitting this session to master from backup status. In addition, once the FPGA 22 receives a packet with higher priority than itself, the FPGA 22 puts the message in CPU DDR through DMA. Then the FPGA 22 will generate an interrupt to the CPU 23 for informing a new packet received. Then the CPU 23 will get the packet through DDR, and handle the protocol stack 231 to transmit this session to back-up from master status. Because the two functions are offloaded to the FPGA, the CPU's resources can be greatly saved.

In the scenario where interrupts happen occasionally, there are only scattered traffics. No matter what scheme is employed, there are a small number of interrupts which do not put too much burden on the CPU's processing. However, in large-scale scenarios (for example, for 1024 sessions with 3 ms sending packet interval), the timeout for each session is 9 ms. When port is down or optical fiber fails, the traffic convergence time cannot meet the 50 ms requirement.

Further analysis showed that in this scenario, the 1024 sessions were in timeout status at the same time due to the link down. In this whole process, the CPU handled more than 10K interrupt events, many of which were repeated. Because the CPU could not handle all interrupts within 9 ms, the FPGA repeatedly reported the same session every 9 ms.

Burst message reporting will also cause the same problem. If it is not handled properly, it will easily lead to storms. Before the previous packet is not processed, a new packet comes again, forming a vicious circle.

Interrupt is also a big CPU consumer. Because of the high priority of interrupt handling, the CPU will suspend the execution of normal functions, and handle the interrupt. Thus, frequent interrupt reporting by the FPGA will seriously affect the normal function of the CPU.

The common interrupt application is used to deal with a small number of interrupts. There are many types of interrupt application, which generally do not produce numerous interrupts simultaneously. However, in the above new special scenario where the same type, and a particularly large number of interrupt events occur simultaneously, the performance of the CPU will be seriously affected.

The present disclosure proposes an improved solution for a data processing device, a coprocessor and methods performed thereby. The solution may be applicable to the scenario where interrupts caused by a plurality of interrupt sources (especially numerous interrupt sources) needs to be (e.g. almost simultaneously) reported from a coprocessor to a CPU in a data processing device. For example, the coprocessor performs parallel tasks, and there are many parallel tasks of the same kind. The data processing device may be a communication device or a network device (e.g. a router, a gateway, a server such as an OAM server and a data center server, etc.), or any other data processing device suitable for use in the scenario described above. Hereinafter, the solution will be described in detail with reference to FIGS. 3-8.

Figure 3:
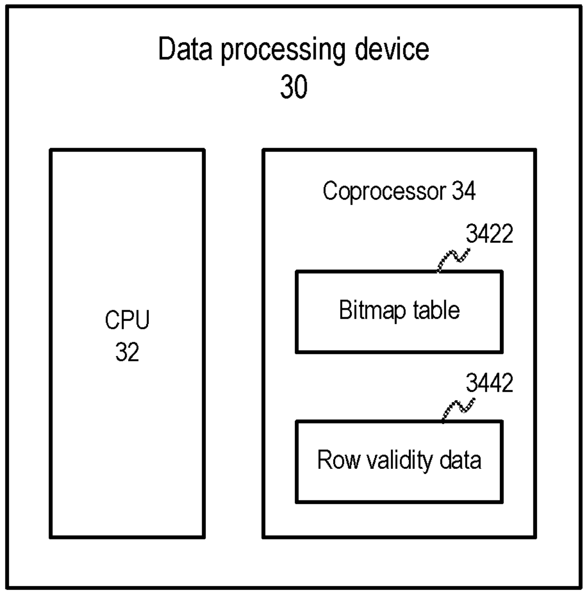
FIG. 3 is a diagram illustrating a data processing device according to an embodiment.

FIG. 3 is a diagram illustrating a data processing device according to an embodiment. As shown, the data processing device 30 comprises a CPU 32, and a coprocessor 34 configured to perform predetermined tasks for a plurality of sessions, and to report, for at least one session satisfying a predetermined condition, at least one interrupt event to the CPU 32. Although one CPU is shown in FIG. 2, there may be more than one CPU contained in the data processing device 30. The coprocessor 34 may be implemented by, but not limited to, any one of a field programmable gate array (FPGA), a specific application integrated circuit (ASIC), a data processing unit (DPU), an intelligence processing unit (IPU), etc.

The coprocessor 34 cooperates with the CPU 32 to achieve the function of the data processing device 30. Thus, the predetermined task may be different depending on the function of the data processing device 30. As an exemplary example, the data processing device may be a router device. Correspondingly, the predetermined task may be associated with VRRP. Each session may correspond to one of multiple virtual interfaces (e.g. virtual local area networks (VLANs)) on every physical port of the router device. The predetermined condition may be a condition under which a timeout event is detected or a DMA interrupt event occurs. As another example, depending on the function of the data processing device, the predetermined task may be associated with, but not limited to, any one of bidirectional forwarding detection (BFD), operation, administration and maintenance (OAM, e.g. based on international telecommunication union (ITU) Y.1731 or institute of electrical and electronics engineers (IEEE) 802.3ah), connectivity fault management (CFM, e.g. based on IEEE 802.1ag), memory error checking and correcting (ECC), etc. Correspondingly, the predetermined condition may be flexibly defined as long as an interrupt event needs to be reported by the coprocessor towards the CPU under the predetermined condition.

The coprocessor 34 is configured to maintain a bitmap table 3422 and row validity data 3442. The bitmap table 3422 indicates, for each of the plurality of sessions, whether there is an interrupt event needing to be reported to the CPU 32. For example, when an interrupt event occurs, it may be determined that there is an interrupt event needing to be reported to the CPU. The bitmap table 3422 may be a two-dimensional array of bits each corresponding to one of the plurality of sessions. The bit may take the value of one when there is an interrupt event needing to be reported to the CPU for the corresponding session, and take the value of zero when there is no interrupt event needing to be reported to the CPU for the corresponding session. By using the bitmap table 3422, information about multiple sessions can be represented by one binary value corresponding to a row. This can greatly improve the efficiency of interrupt event reporting when compared with the solution of using multiple binary values to respectively indicating multiple sessions.

The row validity data 3442 indicates, for each of rows of the bitmap table 3422, whether the row has at least one interrupt event needing to be reported to the CPU 32. For example, the row validity data 3442 may be a one-dimensional array of bits whose number is equal to the number of the rows of the bitmap table 3422. The bit corresponding to a row may take the value of one when the row has at least one interrupt event needing to be reported to the CPU, and take the value of zero when the row has no interrupt event needing to be reported to the CPU. As long as one bit in the row takes the value of one (which indicates there is an interrupt event needing to be reported to the CPU for the corresponding session), the row may be determined to have at least one interrupt event needing to be reported to the CPU. Thus, the row validity data for a row of the bitmap table may be a result of an OR operation between the bits of the row. By using the row validity data 3442, it is possible for the CPU 32 to avoid reading of the row(s) having no interrupt event needing to be reported to the CPU 32, thereby reducing the workload of the CPU 32.

The CPU 32 is configured to, in response to an interrupt signal triggered by the coprocessor 34, read, from the bitmap table 3422, at least one row that has at least one interrupt event needing to be reported to the CPU 32, according to the row validity data 3442. For example, in response to the interrupt signal, the CPU 32 may read, from the bitmap table 3422, row(s) whose corresponding row validity data takes the value of one (which indicates the row(s) have at least one interrupt event needing to be reported to the CPU). When the CPU 32 performs the reading operation, because all of the row(s) which are valid at that time can be read by the CPU 32, it is possible for the coprocessor 34 to report many interrupt events as possible to the CPU 32 by triggering only one interrupt signal. Note that the expression of "a row is valid" refers to that the row has at least one interrupt event needing to be reported to the CPU.

As an option, the coprocessor 34 may be configured to operate in a first mode where the interrupt signal is triggered immediately after there is an interrupt event needing to be reported to the CPU 32. The first mode may be suitable for real-time scenario where the interrupt event needs to be processed by the CPU in real time. As another option, the coprocessor 34 may be configured to operate in a second mode where the interrupt signal is triggered when a predetermined time period has elapsed since there is an interrupt event needing to be reported to the CPU 32. The second mode is suitable for normal scenario where the interrupt event has low real-time requirement and is suitable for batch processing.

Optionally, the interrupt event may comprise a first type of interrupt event and a second type of interrupt event. The coprocessor 34 may be configured to maintain, for each of the first type of interrupt event and the second type of interrupt event, a separate set of the bitmap table and the row validity data. For example, the first type of interrupt event may be suitable for the first mode described above, and the second type of interrupt event may be suitable for the second mode described above.

Figure 4:
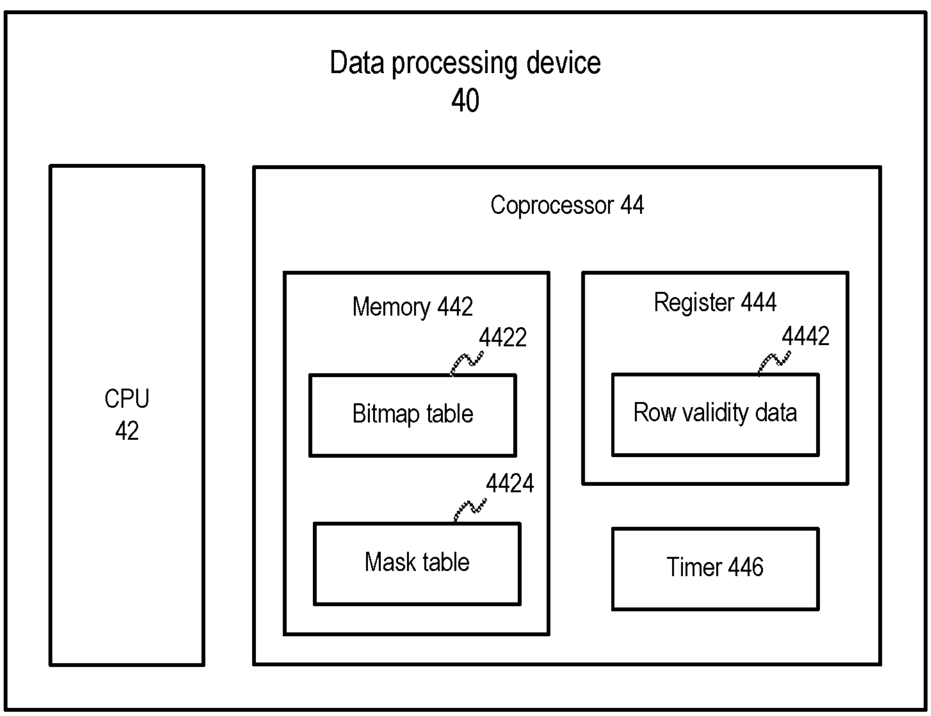
FIG. 4 is a diagram illustrating a data processing device according to an embodiment.

FIG. 4 is a diagram illustrating a data processing device according to an embodiment. As shown, the data processing device 40 comprises a CPU 42, and a coprocessor 44 configured to perform predetermined tasks for a plurality of sessions, and to report, for at least one session satisfying a predetermined condition, at least one interrupt event to the CPU 42. Similar to the data processing device 30, there may be more than one CPU contained in the data processing device 40. The coprocessor 44 may be implemented by, but not limited to, any one of an FPGA), an ASIC, a DPU, an IPU, etc. The predetermined task may be different depending on the function of the data processing device 40. Correspondingly, the predetermined condition may be flexibly defined as long as an interrupt event needs to be reported by the coprocessor towards the CPU under the predetermined condition.

Similar to the data processing device 30, the coprocessor 44 is configured to maintain a bitmap table 4422 and row validity data 4442. The bitmap table 4422 indicates, for each of the plurality of sessions, whether there is an interrupt event needing to be reported to the CPU 42. By using the bitmap table 4422, information about multiple sessions can be represented by one binary value corresponding to a row. This can greatly improve the efficiency of interrupt event reporting when compared with the solution of using multiple binary values to respectively indicating multiple sessions. The row validity data 4442 indicates, for each of rows of the bitmap table 4422, whether the row has at least one interrupt event needing to be reported to the CPU 42. By using the row validity data 4442, it is possible for the CPU 42 to avoid reading of the row(s) having no interrupt event needing to be reported to the CPU 42, thereby reducing the workload of the CPU 42.

Similar to the data processing device 30, the CPU 42 is configured to, in response to an interrupt signal triggered by the coprocessor 44, read, from the bitmap table 4422, at least one row that has at least one interrupt event needing to be reported to the CPU 42, according to the row validity data 4442. When the CPU 42 performs the reading operation, because all of the row(s) which are valid at that time can be read by the CPU 42, it is possible for the coprocessor 44 to report many interrupt events as possible to the CPU 42 by triggering only one interrupt signal.

Unlike the data processing device 30, the coprocessor 44 comprises a memory (e.g. a random access memory (RAM)) 442 and a register 444. The memory 442 is configured to store the bitmap table 4422 and a mask table 4424. The register 444 is configured to store the row validity data 4442. Note that the mask table 4424 is not limited to be stored in the memory 442 and the same effect described later can be achieved as long as the coprocessor 44 maintains the mask table 4424.

The mask table 4424 indicates, for each of the plurality of sessions, whether the session is in a masked state where an interrupt event is prevented from being reported to the CPU 42 when the interrupt event occurs. For example, the coprocessor 44 may be configured to set a session in the mask table 4424 to be in the masked state, when a same interrupt event has been reported previously to the CPU 42 for the session and the CPU 42 has not finished handling of the session. On the other hand, in the case where an interrupt event occurs for a session and there has not been a same interrupt event reported previously to the CPU for the session, or in the case where an interrupt event occurs for a session, and there has been a same interrupt event reported previously to the CPU for the session, and the CPU has finished handling of the session, the coprocessor 44 may set the session in the mask table 4424 to be not in the masked state. Accordingly, the coprocessor 44 may be configured to, when an interrupt event occurs for a session and the session is not indicated by the mask table 4424 to be in the masked state, set the bitmap table 4422 to indicate, for the session, that there is an interrupt event needing to be reported to the CPU 42. Thus, by using the mask table 4424, it is possible to prevent the same interrupt event from being repeatedly reported to the CPU 42.

For example, the mask table 4424 may be a two-dimensional array of bits each corresponding to one of the plurality of sessions. The bit may take the value of one when the corresponding session is not in the masked state, and take the value of zero when the corresponding session is in the masked state. Initially, all of the bits in the mask table may be set to one. Then, if an interrupt event occurs for any session, the corresponding bit in the mask table may be set to zero. Then, when the CPU has finished handling of this session, the corresponding bit in the mask table may be set back to one.

Similar to the data processing device 30, as an option, the coprocessor 44 may be configured to operate in a first mode where the interrupt signal is triggered immediately after there is an interrupt event needing to be reported to the CPU 42. The first mode may be suitable for real-time scenario where the interrupt event needs to be processed by the CPU in real time. As another option, the coprocessor 44 may be configured to operate in a second mode where the interrupt signal is triggered when a predetermined time period has elapsed since there is an interrupt event needing to be reported to the CPU 42. The second mode is suitable for normal scenario where the interrupt event has low real-time requirement and is suitable for batch processing.

Unlike the data processing device 30, the coprocessor 44 comprises a timer 446 whose expiry time is equal to the predetermined time period. The timer 446 may be started when there is an interrupt event needing to be reported to the CPU 42. When the timer 446 expires, the coprocessor 44 may trigger the interrupt signal.

Optionally, the interrupt event may comprise a first type of interrupt event and a second type of interrupt event. The coprocessor 44 may be configured to maintain, for each of the first type of interrupt event and the second type of interrupt event, a separate set of the bitmap table, the row validity data and the mask table. For example, the first type of interrupt event may be suitable for the first mode described above, and the second type of interrupt event may be suitable for the second mode described above.

In the above description, the expression of "there is an interrupt event needing to be reported to the CPU" may refer to one of the following three cases: 1) a case where an interrupt event occurs (which may correspond to the case where the mask table is not used); 2) a case where an interrupt event occurs for a session and there has not been a same interrupt event reported previously to the CPU for the session (which may correspond to the case where the mask table is used); and 3) a case where an interrupt event occurs for a session, and there has been a same interrupt event reported previously to the CPU for the session, and the CPU has finished handling of the session (which may correspond to the case where the mask table is used).

Figure 5:
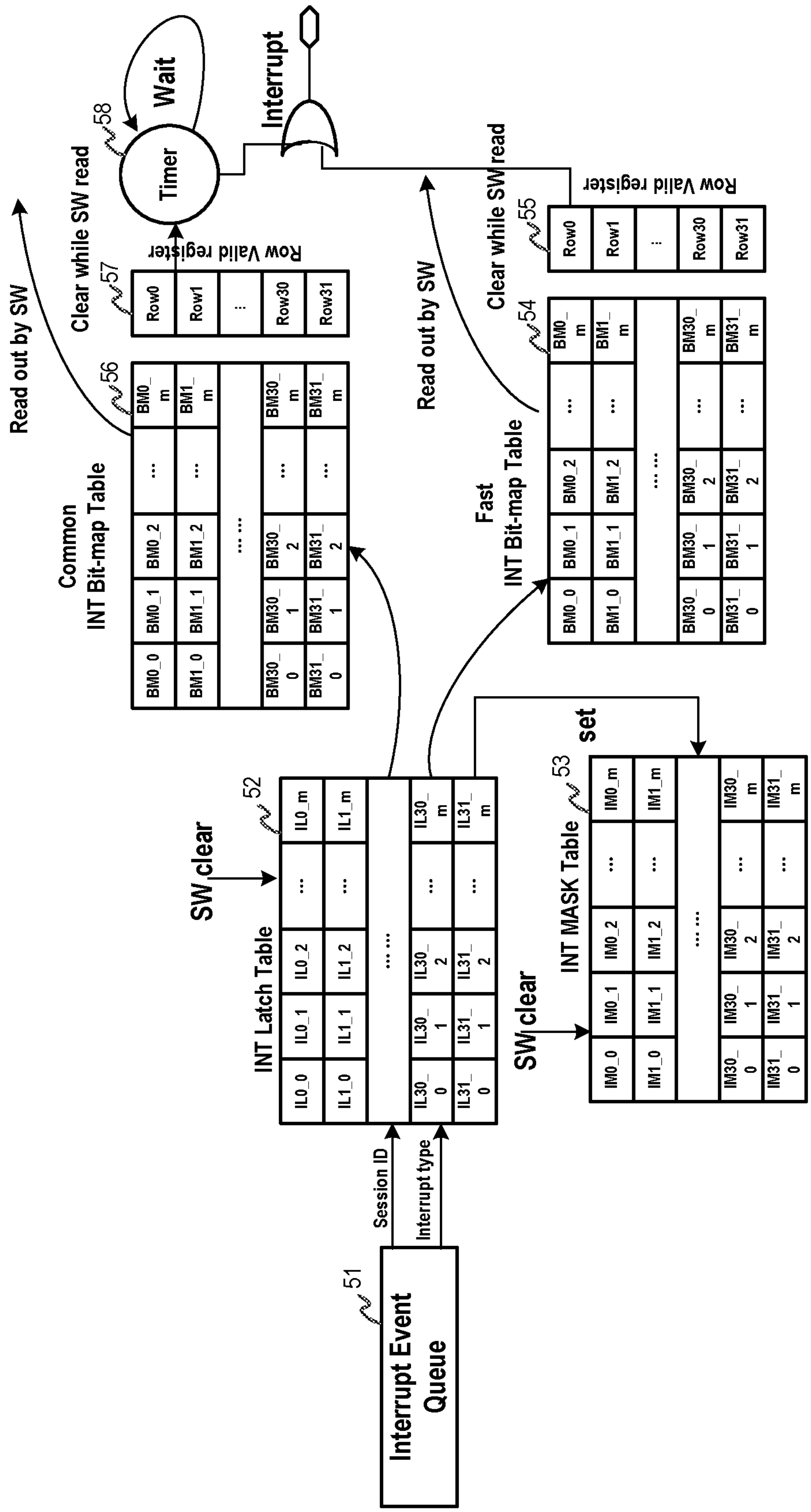
FIG. 5 is a diagram illustrating the working principle of a data processing device according to an embodiment.

For ease of understanding, a network device using VRRP will be described below as an exemplary example. In this network device, the coprocessor is an FPGA. FIG. 5 illustrates the working principle of the network device. To reduce the interactions between the CPU and the FPGA as much as possible, when the FPGA discovers the link failure and needs to report the timeout interrupt to the CPU, an interrupt latch table 52, an interrupt mask table 53, an interrupt bit-map table 54 or 56, and a row valid register 55 or 57 are used. The tables 52, 53, 54 and 56 may all be two-dimensional arrays. The widths and depths thereof may be related to the scale and RAM type of the FPGA.

As shown, information (e.g. session ID and interrupt type) about interrupt events in the interrupt event queue 51 may be put into the interrupt latch table 52. The interrupt latch table 52 is used to store interrupt events, which are stored when the interrupt events occur. After an interrupt event is reported to the CPU, it will be cleared by the CPU (e.g. in the form of software (SW) clear as shown in FIG. 5).

The interrupt mask table 53 is used to prevent the new generated interrupt event from being pushed into the interrupt bit-map table 54 or 56 if a same interrupt event has been pushed before. According to the interrupt mask table 53, the interrupt event of each session is reported to the CPU only once, and there will be no redundant report.

The interrupt bit-map table 54 or 56 is used to improve reporting efficiency. It may be divided into "Fast mode" interrupt bit-map table 54 and "Common mode" (or "normal mode") interrupt bit-map table 56. The "Fast mode" is suitable for real-time scenes, such as BFD, VRRP timeout detection, etc. In this mode, whenever an interrupt event occurs for a session and this session is not masked, the FPGA immediately triggers the interrupt event to be reported to the CPU.

In the "Common mode", interrupt reporting can be delayed, which is suitable for interrupt tasks with low real-time requirements but suitable for batch processing, such as ECC recovery interrupts for DDR memory. For example, a timer 58 may be started by the FPGA in the "Common mode", and an interval may be configured by the CPU, which triggers the final interrupt reporting when the interval time arrives. During this waiting process, many interrupts may accumulate, which can be disposed of through one interruption report.

For example, these two modes can be configured by the CPU. Interrupts in these two modes may be separated when generating corresponding INT bit-map tables. That is, Fast INT bit-map table and Common INT bit-map table are separately generated.

In this exemplary example, in register accesses (such as PCI-E memory read/write, local bus, Wishbone, etc.), each access is 32 bit wide. Assume that there are 1024 sessions. Then, the bit-map table may be designed as having 32-bits width and 32-bits address depth. That is, the bit-map table has 32 rows and 32 columns. The 32 bits in each row represent 32 sessions.

For instance, Row 0's bit[0] is mapped to session 0, bit[1] is mapped to session 1, . . . , and bit[31] is mapped to session 31. Row 1's bit[0] is mapped to session 32, bit[1] is mapped to session 33, . . . , and bit[31] is mapped to session 63. Likewise, Row n's bit[0] is mapped to session 32*n, bit[1] is mapped to session 32*n+1, . . . , and bit[31] is mapped to session 32*n+31. Row 31's bit[0] is mapped to session 992, bit[1] is mapped to session 993, . . . , and bit[31] is mapped to session 1023.

The INT bit-map table 54 or 56 may be stored in an RAM of the FPGA. For RAM access, every time the CPU reads one address, it can get 32 sessions.

The row valid register 55 or 57 is used to indicate which row has valid information. The row valid register[n] may be a result of an OR operation between the 32 bits in row[n].

When an interrupt signal is received, the CPU first reads the row valid register 55 or 57, obtains the number(s) of the row(s) with interrupt event(s) in the INT Bit-map table 54 or 56, and then reads the corresponding RAM address of the INT Bit-map table 54 or 56. Especially, in the burst scenario, multiple addresses may be read in one interrupt. In this way, the CPU can read the row valid register in a targeted way without traversing the INT Bit-map table.

Essentially, multiple interrupt sources can be obtained by one interrupt, which can reduce the number of interrupts and the number of CPU accesses to the FPGA. In an extreme example (which may be a purely ideal situation), if the working scene is known in advance so that Common mode is used to wait 9 ms to collect all interrupt sources, then all state machine switches can be realized with only one interrupt.

With respect to the DMA interrupt to the CPU, when the FPGA sends message to the CPU through DMA, it may notify the CPU through an interrupt. Receiving DMA message itself generally does not affect the CPU performance, but it is the interrupt that will affect the CPU performance.

The DMA interrupt reporting may be the same as the timeout interruption reporting as described above. Therefore, the times of interrupt reporting and the times of CPU reading FPGA registers can be reduced in the same way, and finally the workload of the CPU can be reduced. In particular, when the timeout occurs or the priority changes, the number of interactions between the FPGA and the CPU can be less than or equal to the number of sessions. Through experiments, it was found that the interruptions and packets sending to the CPU were less than one tenth of those of the solution which does not employ the tables 53 and 54 (or 56) as well as the register 55 (or 57). Therefore, the embodiment of the disclosure can provide fast convergence with large scalability.

Figure 6:
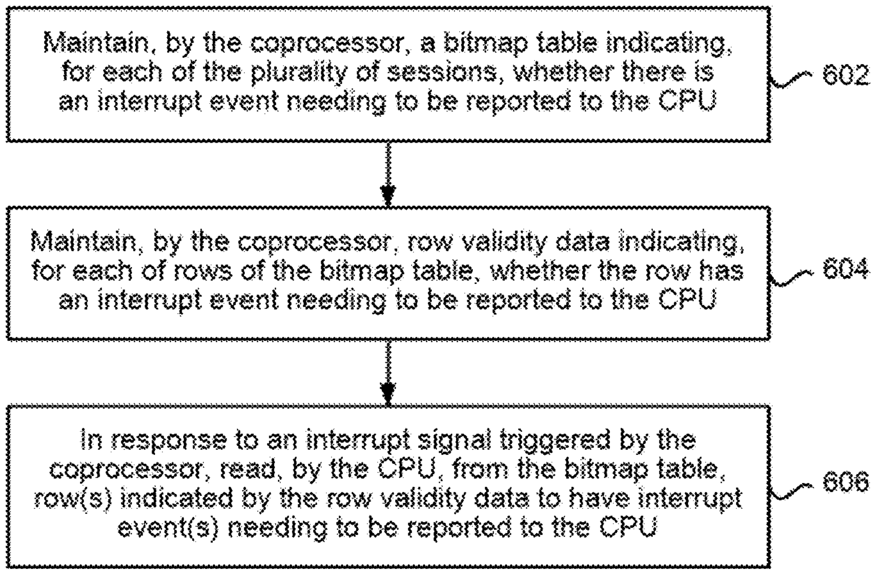
FIG. 6 is a flowchart illustrating a method performed by a data processing device according to an embodiment of the disclosure.

FIG. 6 is a flowchart illustrating a method performed by a data processing device according to an embodiment of the disclosure. The method may be applicable to the scenario where the data processing device comprises a CPU, and a coprocessor configured to perform predetermined tasks for a plurality of sessions, and to report, for at least one session satisfying a predetermined condition, at least one interrupt event to the CPU. At block 602, the coprocessor maintains a bitmap table indicating, for each of the plurality of sessions, whether there is an interrupt event needing to be reported to the CPU. The details about the bitmap table have been described above and thus are omitted here. By maintaining the bitmap table, information about multiple sessions can be represented by one binary value corresponding to a row. This can greatly improve the efficiency of interrupt event reporting when compared with the solution of using multiple binary values to respectively indicating multiple sessions. At block 604, the coprocessor maintains row validity data indicating, for each of rows of the bitmap table, whether the row has at least one interrupt event needing to be reported to the CPU. The details about the row validity data have been described above and thus are omitted here. By maintaining the row validity data, it is possible for the CPU to avoid reading of the row(s) having no interrupt event needing to be reported to the CPU, thereby reducing the workload of the CPU.

At block 606, in response to an interrupt signal triggered by the coprocessor, the CPU reads, from the bitmap table, at least one row that has at least one interrupt event needing to be reported to the CPU, according to the row validity data. When the CPU performs the reading operation, because all of the row(s) which are valid at that time can be read by the CPU, it is possible for the coprocessor to report many interrupt events as possible to the CPU by triggering only one interrupt signal.

For example, there may be two operation modes of the coprocessor. In the first mode, the interrupt signal may be triggered immediately after there is an interrupt event needing to be reported to the CPU. In the second mode, the interrupt signal may be triggered when a predetermined time period has elapsed since there is an interrupt event needing to be reported to the CPU.

Optionally, the interrupt event may comprise a first type of interrupt event and a second type of interrupt event. A separate set of the bitmap table and the row validity data may be maintained for each of the first type of interrupt event and the second type of interrupt event.

Figure 7:
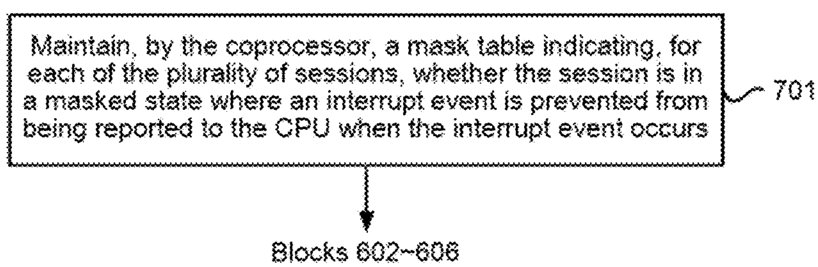
FIG. 7 is a flowchart illustrating a method performed by a data processing device according to an embodiment of the disclosure.

FIG. 7 is a flowchart illustrating a method performed by a data processing device according to an embodiment of the disclosure. The method may be applicable to the scenario where the data processing device comprises a CPU, and a coprocessor configured to perform predetermined tasks for a plurality of sessions, and to report, for at least one session satisfying a predetermined condition, at least one interrupt event to the CPU. As shown, the method comprises block 701 and blocks 602-606. At block 701, the coprocessor maintains a mask table indicating, for each of the plurality of sessions, whether the session is in a masked state where an interrupt event is prevented from being reported to the CPU when the interrupt event occurs. The details about the mask table have been described above and thus are omitted here. By maintaining the mask table, it is possible to prevent the same interrupt event from being repeatedly reported to the CPU. Blocks 602-606 have been described above and their details are omitted here.

Based on the above description, an aspect of the present disclosure provides a coprocessor (e.g. the coprocessor 34 or 44) for use in data processing device (e.g. the data processing device 30 or 40). The data processing device comprises a CPU, and the coprocessor configured to perform predetermined tasks for a plurality of sessions, and to report, for at least one session satisfying a predetermined condition, at least one interrupt event to the CPU. The coprocessor is configured to maintain: a bitmap table indicating, for each of the plurality of sessions, whether there is an interrupt event needing to be reported to the CPU; and row validity data indicating, for each of rows of the bitmap table, whether the row has at least one interrupt event needing to be reported to the CPU.

Figure 8:
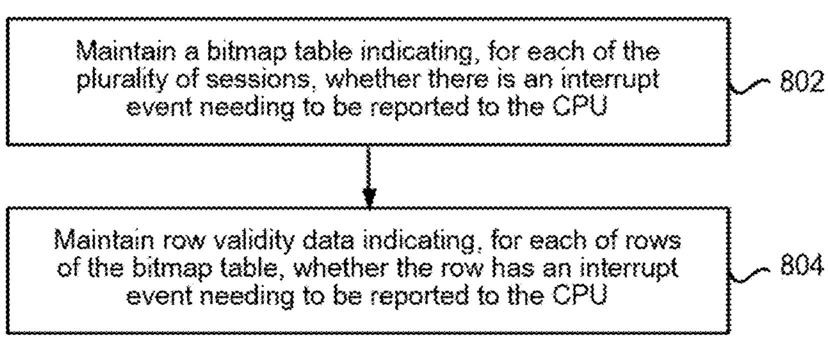
FIG. 8 is a flowchart illustrating a method performed by a coprocessor according to an embodiment of the disclosure.

FIG. 8 is a flowchart illustrating a method performed by a coprocessor for use in data processing device according to an embodiment of the disclosure. The method may be applicable to the scenario where the data processing device comprises a CPU, and the coprocessor configured to perform predetermined tasks for a plurality of sessions, and to report, for at least one session satisfying a predetermined condition, at least one interrupt event to the CPU. At block 802, the coprocessor maintains a bitmap table indicating, for each of the plurality of sessions, whether there is an interrupt event needing to be reported to the CPU. By maintaining the bitmap table, information about multiple sessions can be represented by one binary value corresponding to a row. This can greatly improve the efficiency of interrupt event reporting when compared with the solution of using multiple binary values to respectively indicating multiple sessions. At block 804, the coprocessor maintains row validity data indicating, for each of rows of the bitmap table, whether the row has at least one interrupt event needing to be reported to the CPU. By maintaining the row validity data, it is possible for the CPU to avoid reading of the row(s) having no interrupt event needing to be reported to the CPU, thereby reducing the workload of the CPU.

Based on the above description, another aspect of the present disclosure provides a CPU (e.g. the CPU 32 or 42) for use in data processing device (e.g. the data processing device 30 or 40). The data processing device comprises the CPU, and the coprocessor configured to perform predetermined tasks for a plurality of sessions, and to report, for at least one session satisfying a predetermined condition, at least one interrupt event to the CPU. The coprocessor is configured to maintain: a bitmap table indicating, for each of the plurality of sessions, whether there is an interrupt event needing to be reported to the CPU; and row validity data indicating, for each of rows of the bitmap table, whether the row has at least one interrupt event needing to be reported to the CPU. The CPU is configured to, in response to an interrupt signal triggered by the coprocessor, read, from the bitmap table, at least one row that has at least one interrupt event needing to be reported to the CPU, according to the row validity data.

Yet another aspect of the present disclosure provides a method performed by a CPU (e.g. the CPU 32 or 42) for use in data processing device (e.g. the data processing device 30 or 40). The data processing device comprises the CPU, and the coprocessor configured to perform predetermined tasks for a plurality of sessions, and to report, for at least one session satisfying a predetermined condition, at least one interrupt event to the CPU. The coprocessor is configured to maintain: a bitmap table indicating, for each of the plurality of sessions, whether there is an interrupt event needing to be reported to the CPU; and row validity data indicating, for each of rows of the bitmap table, whether the row has at least one interrupt event needing to be reported to the CPU. The method comprises, in response to an interrupt signal triggered by the coprocessor, reading, from the bitmap table, at least one row that has at least one interrupt event needing to be reported to the CPU, according to the row validity data.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one skilled in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements. It should be noted that two blocks shown in succession in the above figures may, in fact, be executed substantially concurrently, or the blocks may sometimes be executed in the reverse order, depending upon the functionality involved.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A data processing device comprising:
- a central processing unit (CPU); and
- a coprocessor configured to perform predetermined tasks for a plurality of sessions, and to report, for at least one session satisfying a predetermined condition, at least one interrupt event to the CPU;
- wherein the coprocessor is configured to operate in a first mode where an interrupt signal is triggered immediately after there is an interrupt event needing to be reported to the CPU, and wherein there is an interrupt event needing to be reported to the CPU when: (a) an interrupt event occurs; or (b) an interrupt event occurs for a session and there has not been a same interrupt event reported previously to the CPU for the session; or (c) an interrupt event occurs for a session, and there has been a same interrupt event reported previously to the CPU for the session, and the CPU has finished handling of the session;
- wherein the coprocessor is configured to maintain:
- a bitmap table indicating, for each of the plurality of sessions, whether there is an interrupt event needing to be reported to the CPU; and
- row validity data indicating, for each of rows of the bitmap table, whether the row has at least one interrupt event needing to be reported to the CPU; and
- wherein the CPU is configured to, in response to the interrupt signal triggered by the coprocessor, read, from the bitmap table, at least one row that has at least one interrupt event needing to be reported to the CPU, according to the row validity data.

2. The data processing device according to claim 1, wherein the coprocessor comprises a memory configured to store the bitmap table.

3. The data processing device according to claim 1, wherein the coprocessor comprises a register configured to store the row validity data.

4. The data processing device according to claim 1, wherein the row validity data for a row of the bitmap table is a result of an OR operation between bits of the row.

5. The data processing device according to claim 1, wherein the coprocessor is configured to operate in a second mode where the interrupt signal is triggered when a predetermined time period has elapsed since there is an interrupt event needing to be reported to the CPU.

6. The data processing device according to claim 5, wherein the coprocessor comprises a timer whose expiry time is equal to the predetermined time period.

7. The data processing device according to claim 1, wherein the interrupt event comprises a first type of interrupt event and a second type of interrupt event; and
- wherein the coprocessor is configured to maintain, for each of the first type of interrupt event and the second type of interrupt event, a separate set of the bitmap table and the row validity data.

8. The data processing device according to claim 1, wherein the coprocessor is configured to maintain a mask table indicating, for each of the plurality of sessions, whether the session is in a masked state where an interrupt event is prevented from being reported to the CPU when the interrupt event occurs.

9. The data processing device according to claim 8, wherein the coprocessor comprises a memory configured to store the mask table.

10. The data processing device according to claim 8, wherein the coprocessor is configured to set a session in the mask table to be in the masked state, when a same interrupt event has been reported previously to the CPU for the session and the CPU has not finished handling of the session.

11. The data processing device according to claim 8, wherein the coprocessor is configured to, when an interrupt event occurs for a session and the session is not indicated by the mask table to be in the masked state, set the bitmap table to indicate, for the session, that there is an interrupt event needing to be reported to the CPU.

12. The data processing device according to claim 1, wherein the predetermined task is associated with one of:
- virtual router redundancy protocol (VRRP);
- bidirectional forwarding detection (BFD);
- operation, administration and maintenance (OAM);
- connectivity fault management (CFM); and
- memory error checking and correcting (ECC).

13. The data processing device according to claim 1, wherein the coprocessor is configured in one of:
- a field programmable gate array (FPGA);
- a specific application integrated circuit (ASIC);
- a data processing unit (DPU); and
- an intelligence processing unit (IPU).

14. The data processing device according to claim 1, wherein the data processing device is one of:
- a communication device; and
- a network device.

15. A method performed by a data processing device, wherein the data processing device comprises a central processing unit (CPU), and a coprocessor configured to perform predetermined tasks for a plurality of sessions, and to report, for at least one session satisfying a predetermined condition, at least one interrupt event to the CPU, the method comprising:
- operating, by the coprocessor, in a first mode where an interrupt signal is triggered immediately after there is an interrupt event needing to be reported to the CPU, and wherein there is an interrupt event needing to be reported to the CPU when: (a) an interrupt event occurs; or (b) an interrupt event occurs for a session and there has not been a same interrupt event reported previously to the CPU for the session; or (c) an interrupt event occurs for a session, and there has been a same interrupt event reported previously to the CPU for the session, and the CPU has finished handling of the session;
- maintaining, by the coprocessor, a bitmap table indicating, for each of the plurality of sessions, whether there is an interrupt event needing to be reported to the CPU;
- maintaining, by the coprocessor, row validity data indicating, for each of rows of the bitmap table, whether the row has at least one interrupt event needing to be reported to the CPU; and
- in response to the interrupt signal triggered by the coprocessor, reading, by the CPU, from the bitmap table, at least one row that has at least one interrupt event needing to be reported to the CPU, according to the row validity data.

16. The method according to claim 15, wherein the row validity data for a row of the bitmap table is a result of an OR operation between bits of the row.

17. The method according to claim 15, wherein the data processing device is one of:

a communication device; and a network device.

18. A coprocessor for use in a data processing device, wherein the data processing device comprises a central processing unit (CPU), and the coprocessor configured to perform predetermined tasks for a plurality of sessions, and to report, for at least one session satisfying a predetermined condition, at least one interrupt event to the CPU;

wherein the coprocessor is configured to operate in a first mode where an interrupt signal is triggered immediately after there is an interrupt event needing to be reported to the CPU, and wherein there is an interrupt event needing to be reported to the CPU when: (a) an interrupt event occurs; or (b) an interrupt event occurs for a session and there has not been a same interrupt event reported previously to the CPU for the session; or (c) an interrupt event occurs for a session, and there has been a same interrupt event reported previously to the CPU for the session, and the CPU has finished handling of the session;

wherein the coprocessor is configured to maintain:

a bitmap table indicating, for each of the plurality of sessions, whether there is an interrupt event needing to be reported to the CPU; and row validity data indicating, for each of rows of the bitmap table, whether the row has at least one interrupt event needing to be reported to the CPU.

* * * * *